United States Patent
Schiødt et al.

(10) Patent No.: US 7,090,789 B2
(45) Date of Patent: Aug. 15, 2006

(54) PROCESS AND CATALYST FOR TREATMENT OF SYNTHESIS GAS

(75) Inventors: Niels Christian Schiødt, Brønshøj (DK); Poul Erik Højlund Nielsen, Fredensborg (DK); Peter Lehrmann, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 184 days.

(21) Appl. No.: 10/756,463

(22) Filed: Jan. 14, 2004

(65) Prior Publication Data

US 2004/0191164 A1 Sep. 30, 2004

(30) Foreign Application Priority Data

Feb. 5, 2003 (DK) ............................... 2003 00160

(51) Int. Cl.
*C01B 3/16* (2006.01)
*C01B 3/18* (2006.01)

(52) U.S. Cl. .................... 252/373; 423/448.2; 423/656

(58) Field of Classification Search .............. 423/656, 423/448.2; 252/373
See application file for complete search history.

(56) References Cited

U.S. PATENT DOCUMENTS

| | | | |
|---|---|---|---|
| 4,177,252 A * | 12/1979 | Chinchen | 423/656 |
| 4,400,309 A | 8/1983 | McMahon et al. | |
| 4,711,773 A * | 12/1987 | Mesters et al. | 423/655 |
| 4,861,745 A | 8/1989 | Huang et al. | |
| 5,167,865 A | 12/1992 | Igarashi et al. | |
| 5,932,141 A | 8/1999 | Rostrop-Nielsen et al. | |
| 5,990,040 A * | 11/1999 | Hu et al. | 502/342 |
| 6,540,975 B1 * | 4/2003 | Tonkovich et al. | 423/659 |
| 6,555,088 B1 * | 4/2003 | Baumann et al. | 423/656 |
| 6,723,298 B1 * | 4/2004 | Baumann et al. | 423/437.2 |
| 6,746,624 B1 | 6/2004 | Christensen et al. | |
| 6,919,066 B1 * | 7/2005 | Holzle et al. | 423/648.1 |
| 2001/0055560 A1 * | 12/2001 | Schiodt et al. | 423/655 |

FOREIGN PATENT DOCUMENTS

| | | |
|---|---|---|
| DE | 195 34 433 | 10/1996 |
| EP | 0296734 * | 12/1988 |
| EP | 0305203 | 3/1989 |
| EP | 0440258 | 8/1991 |
| EP | 0583211 | 2/1994 |
| EP | 0634 990 B1 | 9/1994 |
| EP | 0 855 366 | 7/1998 |
| JP | 48-084808 | 11/1973 |
| JP | 52-065190 | 5/1977 |
| JP | 53-082690 | 7/1978 |
| JP | 61-097105 | 5/1986 |
| JP | 62-216634 | 9/1987 |
| JP | 05155602 | 6/1993 |
| WO | WO200003579 | 1/2000 |

OTHER PUBLICATIONS

I. Dybjkaer, "Tubular Reforming and Autothermal Reforming of a Natural Gas—An Overview of Available Processes," Fuel Processing Technology, vol. 42, No. 2/03, 1995, pp. 85-107, (no month).
F. M. Gottschalk and G.J. Hutchings, "Manganese Oxide Water-Gas Shift Catalysts Initial Optimization Studies", *Applied Catalysis*, 51; 1989 pp. 127-139, (no month).
K. Eguchi et al., "Sorption of Nitrogen Oxides on $MnO_y$-$ZrO_2$ and Pt-$ZrO_2$-$Al_2O_3$", *Applied Catalysis B: Environmental*; 1996; pp. 69-77, (no month).
K. Eguchi et al., "Reversible Sorption of Nitrogen Oxides in Mn-Zr Oxide", *Journal of Catalysis 158*; 1996; pp. 420-426, (no month).
K. Eguchi et al., "Removal of Dilute Nitrogen Oxide by the Absorption in Mn-Zr Oxide", *Bull. Chem. Soc. Jpn.* 68; 1995; pp. 1739-1745, (no month).
I. Matsukuma et al., "Development of Zirconia-based Oxide Sorbents for Removal of No and $NO_2$," *Applied Catalysis B: Environmental 37*, 2002; pp. 107-115, (no month).
J.R. Rostrup-Nielsen and P.E. Højlund-Nielsen, "Deactivation and Poisoning of Catalysts", Chemical Industries Series, vol. 20, Marcel Dekkker, Inc., Jun. 1985.

* cited by examiner

*Primary Examiner*—Wayne A. Langel
(74) *Attorney, Agent, or Firm*—Dickstein Shapiro Morin & Oshinsky LLP

(57) ABSTRACT

A process for the treatment of synthesis gas to increase content of hydrogen and/or carbon monoxide in the gas comprising the step of contacting the synthesis gas with a catalyst comprising oxides of manganese and zirconium, which metals are present in a molar ratio Mn/Zr of between 0.05 to 5.00.

8 Claims, No Drawings

PROCESS AND CATALYST FOR TREATMENT OF SYNTHESIS GAS

FIELD OF THE INVENTION

The present invention pertains to the water gas shift reaction and to materials suitable as water gas shift catalysts. The water gas shift reaction (in short: the shift reaction) is a gas phase equilibrium reaction:

$$CO\ (g) + H_2O\ (g) = CO_2(g) + H_2(g)$$

The reaction equilibrium is of central importance for any process that involves synthesis gas; i.e. steam reforming, the ammonia synthesis, hydrogen and reducing gases production etc.

Thus, an effluent stream from a steam reforming process may be enriched in hydrogen by contacting the stream with a catalyst that promotes the shift reaction.

The water gas shift reaction may also be used in the reverse fashion for the production of carbon monoxide by hydrogenation of carbon dioxide. Production of carbon monoxide is usually carried out by minimising the amount of water in the process gas and by equilibrating the water gas shift reaction at a high temperature.

It is our intention that the present invention may find use in the production of hydrogen and in the production of carbon monoxide.

BACKGROUND OF THE INVENTION

The shift reaction is exothermic and low temperatures favour CO-conversion. Thus, the lower the temperature, the more a synthesis gas will be shifted towards $CO_2 + H_2$ provided that the gas is contacted with a sufficiently active shift catalyst. Due to the exothermicity of the shift reaction, however, the synthesis gas is usually equilibrated in at least two steps, the first step being operated at a higher temperature than the second step. It is thus common practice to distinguish between carrying out the shift reaction at low temperature (typically 180–300° C., low temperature shift) and at high temperature (typically 300–500° C., high temperature shift).

The current catalyst of choice for high temperature shift is iron oxide, usually in admixture with chromium oxide. This catalyst, however, has the disadvantage that it forms methane if the synthesis gas has too low steam content compared to the content of carbon—in other words, if the oxygen/carbon ratio is below a certain critical value, which is a function of temperature. At temperatures above 500° C., some methane formation is always observed. Furthermore, the catalyst deteriorates very fast at 500° C. and above.

The catalyst materials of the present invention are comprised by a microscopic mixture of manganese oxide and zirconium oxide (Mn—Zr oxide) optionally with other oxidic promoters and optionally with metal promoters.

The catalyst materials of the present invention have the advantage of having very high stability and extremely high selectivity for the water gas shift reaction (i.e. no hydrocarbon formation) and may therefore replace or supplement the traditional iron-based catalysts. When the materials of the present invention are promoted with copper, a significant boosting of the activity is achieved. Promotion of the Mn—Zr oxides with metallic silver has a similar though less pronounced effect of boosting the activity.

Another advantage of the catalysts of the present invention compared to traditional high-temperature water gas shift catalysts is that these materials have superior adhesion properties towards other ceramic materials as well as towards metals. The catalysts of the present invention are therefore highly suitable for the manufacture of catalysed hardware, which may find use in stationary as well as automotive units in which a water gas shift active catalyst is desired.

It is well known that manganese oxide and zirconium oxide separately have some activity for catalysing the water gas shift reaction. It is highly surprising, however, that there is a strong synergistic effect between these oxides. Thus, a microscopic mixture of manganese oxide and zirconium oxide has a much higher catalytic activity than any of the pure oxides, especially after a short time on stream. As is demonstrated in the examples of the present invention under comparable conditions at 450° C. pure manganese oxide has a conversion of 41–42%, pure zirconium oxide has a conversion of 9–11%, while mixed manganese-zirconium oxide catalyst has a conversion of 58–60%. In all cases the equilibrium conversion amounts to 65% under the conditions of operation.

The synergistic effect of manganese oxide and zirconium oxide is particularly surprising in view of the fact that similarly prepared Mg/Zr and Mn/Ti oxides have very low activity. In fact, the Mn/Ti oxide has even lower activity (8–16% conversion under the same conditions as in the above examples) than pure manganese oxide. The Mg/Zr oxide has slightly higher activity (14–17% conversion under similar conditions as in the above examples) than pure zirconium oxide, but this is due to the fact that magnesium oxide itself is a more active catalyst for the shift reaction than zirconium oxide.

Furthermore, the mixed manganese-zirconium oxide catalysts have the surprising advantage of being extremely selective. As is demonstrated in the examples of the present invention, even exposure of these materials to dry synthesis gas does not result in any appreciable formation of methane. At a GHSV of 10000 Nl/g/h only 100 ppm methane was formed (0.01%) at 500° C. and 1000 ppm methane (0.1%) at 600° C. In fact, the selectivity may prove to be even higher, since even microscopic impurities of a number of transition metals under these conditions would result in methane formation.

DESCRIPTION OF PRIOR ART

Industrial water gas shift is described in several publications, e.g. L. Lloyd et al in M. V. Twigg (ed.) "Catalyst Handbook" Manson Publ., 1996; K. Kochloefl, Ch. 3.3 in G. Ertl, H. Knötzinger and J. Weitkamp (eds.) "Handbook of Heterogeneous Catalysis" Vol 4, Wiley-VCH, 1997; and J. R. Rostrup-Nielsen & P. E. Højlund-Nielsen in J. Oudar & H. Wise (eds.) "Deactivation and Poisoning of Catalysts" Marcel Dekker, 1985.

For industrial high temperature water gas shift, the catalysts used at present are based on iron as the active metal component. The preferred formulation has long been an iron-chromium catalyst as disclosed in e.g. U.S. Pat. No. 4,861,745. In EP 0634990 B1, chromium-free high temperature shift catalysts are claimed, but these catalysts are still based on iron as the active metal. Iron based catalysts are also mentioned in EP 062410 B1.

The use of manganese oxide in combination with certain other components is known from the literature. Thus, F. M. Gottschalk and G. J. Hutchings Applied Catalysis 51, 127–139 (1989), reports on the performance of cobalt manganese oxide, copper manganese oxide and iron manganese oxide as water gas shift catalysts. Their study, however, only relates to the use of these materials at temperatures below 400° C. Furthermore, their study does not concern the mixed manganese-zirconium oxides as water gas shift catalysts, which is the object of the present invention.

Mixed manganese-zirconium oxides are known from the literature from a completely different perspective, namely as sorbents for removal of NO and $NO_2$. This subject is treated in a number of papers, I. Matsukuma et al Applied Catalysis B 37, 107 (2002), K. Eguchi et al Applied Catalysis B 16, 69 (1998), K. Eguchi et al Journal of Catalysis 158, 420 (1996), K. Eguchi et al Bulletin of the Chemical Society of Japan 68, 1739 (1995). This field is not related to the water gas shift reaction.

Various oxidic compounds have been claimed as catalysts for the water gas shift reaction at temperatures above 400° C. in ZA 2001/3424. Among these are zirconium oxide and manganese oxide supported on other oxides. However, this patent is not concerned with mixed Mn/Zr oxides. Furthermore, the activity of the catalysts of the present invention is far higher—without compromising the selectivity—than any of the catalyst compositions claimed in the above patent. Finally, the synergistic effect between manganese oxide, MnO and zirconium oxide, $ZrO_2$, which gives rise to an optimum in activity for a relatively narrow range of composition of these materials, is highly surprising. As proved in the examples of the present invention this synergistic effect is thus not present between magnesium oxide and zirconium oxide although MgO is known to resemble MnO in chemical and physical behaviour.

SUMMARY OF THE INVENTION

It is the object of the present invention to provide a catalyst for catalysing the water gas shift reaction at high temperatures essentially without formation of hydrocarbons.

The present invention may be used to enrich a synthesis gas in hydrogen and/or to enrich the synthesis gas in carbon monoxide. By means of the invention, it is possible to control production of hydrogen and carbon monoxide by controlling the temperature and the amount of steam in the synthesis gas.

In the general embodiment of the invention, at least 50% by weight of the catalyst—in its reduced state—is comprised by manganese oxide and zirconium oxide, in which the Mn/Zr ratio is between 0.05 and 5.00, more preferably between 0.05 and 1.00, most preferably between 0.10 and 0.80.

In a specific embodiment of the invention, the catalyst is furthermore promoted with copper, the content of which—by weight of Cu in the reduced catalyst—is between 0.1% and 8.0%, more preferably between 0.1% and 4.0%.

In further a specific embodiment of the invention, the catalyst may have the form of pellets, extrudates, a monolithic or geometrical body and it may be applied as a coating of the tube wall through which the synthesis gas to be treated is transported.

In one particular embodiment of the invention, the catalyst is confined to an adiabatic zone, operating at a temperature of between 400° C. and 1000° C., more preferably between 500° C. and 900° C.

In another particular embodiment of the invention, the catalyst is confined to a zone which is cooled in the direction of the process gas flow, in such a way that the inlet temperature is between 500° C. and 1000° C., more preferably between 700° C. and 900° C., and the exit temperature is between 400° C. and 800° C., more preferably between 400° C. and 700° C.

DETAILED DESCRIPTION OF THE INVENTION

The following examples serve to demonstrate the advantageous properties of the manganeses/zirconium oxide catalysts in terms of activity, selectivity and stability towards the water gas shift reaction.

EXAMPLES

General Procedure

The composition of the catalysts A–W of the present invention including comparative catalysts are listed in Table 7. The catalysts A–H contain only Mn and Zr metal ions, except for residual K, which is also listed in Table 7. The catalysts I and J are included for comparison. Catalyst I contains Mg and Zr, while catalyst J contains Mn and Ti. The catalysts K–O contain ions of Zr, Mn and another oxide forming metal, while catalysts Q–V contain Zr, Mn and either Cu or Ag. The catalysts P and W are commercial water gas shift catalysts included for comparison.

The following procedure and process parameters were used in all examples unless otherwise stated.

In a copper lined, tubular reactor (outer diameter 9.53 mm, inner diameter 4.6 mm) embedded in a self venting oven, 1.00 g of catalyst was arranged in fixed bed manner. The loaded catalyst was in the form of grains of the size fraction 0.71–0.85 mm. Dry gas and steam were admixed at a temperature of 200° C. and the chosen reaction pressure before entering the reactor. The reaction pressure was typically 25 barg. The dimensions of the reactor allowed for the gas to be further heated to the desired temperature before reaching the catalyst. The temperature was controlled externally and monitored by a thermocouple on the reactor outside the centre of the catalyst bed. At a position after the catalyst zone the exit gas was cooled and depressurised to ambient conditions. The water in the exit gas was condensed in a separate container, while the remaining dry gas was analysed continuously for CO and $CO_2$ by means of a BINOS infrared sensor, thus monitoring the effect of the catalyst on the gas composition during heating and cooling. The temperature of the reactor was raised at a rate of 4° C. $min^{-1}$ starting from approximately 200° C. until a temperature $T_{hold}$ of typically 500° C. was reached. During this heating period, the contents of Co in the dry exit gas (measured continuously by means of the BINOS apparatus) was used for obtaining the CO-conversion as a function of temperature. The dry exit gas was regularly analysed by Gas Chromatography (GC) at the hold temperature allowing for measurement of CO, $CO_2$, $H_2$, $CH_4$, higher hydrocarbons and Ar. Ar was used as an internal standard. Mass balances (C, H and O) calculated on the basis of GC-data and the weight of the condensed water were accurate within ±5%.

The dry feed gas was introduced at a rate of typically 10.0 Nl $h^{-1}$ with the composition 74.4% $H_2$, 12.6% CO, 10.0% $CO_2$, 3.0% Ar, while water was fed at a rate of typically 4.25 g $h^{-1}$ corresponding to a steam/dry gas ratio of 0.53 to 0.54.

The catalyst was left on stream at the hold temperature for 12–24 hours. While still on stream, the reactor was cooled to 200–300° C. and again heated to $T_{hold}$ in order to measure the activity of the spent catalyst. In some cases, the catalyst was repeatedly cooled and heated.

Tables 1–3 list the observed CO-conversions for the various catalysts at four different temperatures. The maximum conversion as dictated by the equilibrium composition is included in each case.

Example 1

Catalyst A was tested according to the above general procedure.

During the first heating period, the CO-conversion was 6% at 400° C. with a maximum conversion of 79% at that temperature (in Table 1 written as 6(79)). At 425° C., 450° C. and 475° C. the conversion (equilibrium conversion) was observed to be 11(79)%, 20(69)% and 30(63)%, respectively. The temperature was stabilised and the effluent gas was regularly analysed by GC. The first GC-analysis obtained within one hour at 500° C. confirmed the equilibrium composition of the gas with respect to $H_2$, CO and $CO_2$ and showed no hydrocarbon formation. After 19 hours on stream, the effluent stream was still found to be in equilibrium and free of hydrocarbons. The temperature was decreased to 220° C. and then raised again at a rate of 4° C./min. The conversions were found to be 10(79)%, 21(79)%, 36(69)% and 49(63)%, respectively at 400° C., 425° C., 450° C. and 475° C.

Examples 2–6

The catalysts B, C, D, E and F were tested according to the procedure described in Example 1. The results are given in Table 1. Also with these catalysts, equilibrium conversion was maintained at 500° C. and no hydrocarbon formation was observed.

These examples demonstrate the effect of variation of the Mn/Zr ratio. When taking both activity and stability into consideration, catalysts C and D are the most preferable.

Examples 7–10

Comparative Examples

The catalysts G, H, I and J were tested according to the procedure described in Example 1, the results are in Table 1.

Catalyst G is pure zirconium oxide and catalyst H is pure manganese oxide. Catalyst I is a mixed magnesium-zirconium oxide with a Mg/Zr ratio of 0.38; i.e. the same composition as catalyst C, but with magnesium substituted for manganese. Similarly, catalyst J is a mixed manganese-titanium oxide with a Mn/Ti ratio of 0.38. Thus, titanium has been substituted for zirconium in this catalyst.

It is very surprising to find that these comparative catalysts all have very little activity compared to catalyst C and other of the mixed Mn/Zr oxides.

Example 11

Catalyst E was tested according to the procedure described in Example 1, except for the difference that $T_{hold}$ was 650° C. As expected, the initial conversions are very close to the previous test (Example 5) of catalyst E; the discrepancy being due to experimental uncertainties. The conversions after 21 hours on stream are lower than the conversions of Example 5 due to the higher value of $T_{hold}$.

Example 12

Catalyst D was tested as described in Example 1 except for the difference that the total pressure was varied between 2 barg and 25 barg. The results are given in Table 1.

This example serves to demonstrate that these catalysts may be used within a wide range of operating pressure.

Examples 13–17

The catalysts K, L, M, N and O all contain an additional oxidic promoter; see Table 7. The catalysts were tested as described in Experiment 1. Catalyst K was repeatedly heated to 500° C. and cooled in order to measure the activity loss.

Results are reported in Table 2. It is seen that the relative loss in activity with catalyst ageing may be improved upon by addition of oxidic promoters such as yttrium, niobium and other.

Example 18

Catalyst K was tested in the same manner as described in Example 1 apart from the following differences. The catalyst, in an amount of 0.15 g, was admixed with grains of dead-burned alumina in an amount of 0.85 g of the same size fraction as the catalyst. The surface area of the alumina was 6 $m^2$/g, and the alumina alone was found to have no measurable activity below 600° C. The dry gas flow was 11 Nl/h, while the steam/dry gas ratio was 0.35. The catalyst was heated to a temperature of 600° C. at a pressure of 3 bara and kept on stream under these conditions for 137 hours, while measuring the CO-conversion regularly. The results are given in Table 3.

The activity loss is surprisingly modest considering the very high temperature. Furthermore, the catalyst deactivation seems to stop after some 60 hours on stream.

Example 19

This example was carried out as described in Example 18 with the difference that the temperature was 550° C.

Examples 20–23

These examples serve to demonstrate the very high selectivity of the mixed Mn—Zr oxide catalysts for shift catalysis.

The catalysts D, E and B were tested in the same manner as described in Example 1 except for variation of the steam/dry gas ratio and the operation temperature $T_{hold}$. Examples 20 and 21 demonstrate that methane formation after an induction period is below the detection limit of 15 ppm. At these high temperatures, methane production is very significant with a traditional iron-based high-temperature shift catalyst; see Comparative Example C22.

In Example 23 (see Table 4A), catalyst B is tested in dry synthesis gas at 500° C., 550° C. and finally at 600° C., which for a normal, iron-based catalyst would result in excessive hydrocarbon formation. With the Mn—Zr catalyst, however, hydrocarbon formation is very low even under these conditions. This example forms the basis for the second possible use of the present invention, namely as a process for carbon monoxide production. The $CO_2$-conversion was found to be close to equilibrium at all three temperatures.

Examples 24–30

These examples were carried out as described in Example 1. Catalysts Q–S contain copper in varying concentrations as a metallic promoter component, while catalysts T–V contain silver.

The results given in Table 5 clearly demonstrates the beneficial effect of addition of silver and in particular copper to the Mn—Zr catalysts of the present invention. No methane formation was observed at any point with catalysts Q–V.

Examples 31–34

These examples serve to demonstrate the increased oxygen tolerance of a Cu-promoted Mn—Zr oxide catalyst as compared to a commercial Cu—Zn—Al type low-temperature water gas shift catalyst. The experiments were carried out as follows. The reactor set-up was the same as in the previous examples. The reactor was loaded with 0.5 g of catalyst admixed with 0.5 g inert alumina of the same particle size fraction. The reactor was pressurised with synthesis gas to a total pressure of 3 bara. The reactor was heated to 150° C. in dry synthesis gas at 10 Nl/h. Then 5.3 Nl/h steam was added to the process gas. The reactor was heated on stream to a temperature $T_{redox}$ and left for one hour on stream.

After this initial procedure, the catalyst was submitted to a number of redox-cycles with alternating air-gas and syngas exposure by the following procedure. The process gas stream was shut off and replaced by a flow of 10 Nl/h dry air for 15 minutes. The air was shut off and replaced by synthesis gas (10.0 Nl/h) and steam (5.3 Nl/h), while maintaining the temperature at $T_{redox}$. The temperature was then decreased to 280° C. in the case of catalyst S and 200° C. in the case of the commercial Cu—Zn—Al oxide catalyst for measurement of the CO-conversion.

The activities are listed in Table 6 as % CO-conversion and relative CO-conversion after each redox-cycle.

Comparing Example 31 with Example C33, it is clear that the Cu-promoted Mn—Zr oxide catalyst S has a significantly smaller activity loss than the Cu—Zn—Al oxide catalyst even though the operation temperature $T_{redox}$ is 80° C. higher in the case of the Cu-promoted Mn—Zr oxide catalyst than in the case of the Cu—Zn—Al catalyst. The same trend is seen when comparing Example 32 with Example C34.

TABLE 1

Activity of unpromoted MnO—ZrO$_2$ and comparative catalysts

| Ex. | Catalyst | P barg | $T_{hold}$ ° C. | Mn/Zr ratio | TOS hours | % CO-conv at 400° C. (max % CO conv) | % CO-conv at 425° C. (max % CO conv) | % CO-conv at 450° C. (max % CO conv) | % CO-conv at 475° C. (max % CO conv) |
|---|---|---|---|---|---|---|---|---|---|
| 1 | A | 25 | 500 | 0.06 | 1 | 6(79) | 11(74) | 20(69) | 30(63) |
|   |   | 25 |     |      | 20 | 10(79) | 21(74) | 36(69) | 49(63) |
| 2 | B | 25 | 500 | 0.19 | 1 | 27(76) | 50(71) | 60(66) | 59(60) |
|   |   | 25 |     |      | 16 | 22(79) | 37(74) | 57(69) | 62(64) |
| 3 | C | 25 | 500 | 0.38 | 1 | 54(76) | 64(71) | 58(65) | 58(60) |
|   |   | 25 |     |      | 19 | 34(76) | 55(71) | 60(65) | 57(60) |
| 4 | D | 25 | 500 | 0.44 | 1 | 56(76) | 64(71) | 65(65) | 59(60) |
|   |   | 25 |     |      | 19 | 34(76) | 50(71) | 59(65) | 58(60) |
| 5 | E | 25 | 500 | 0.78 | 1 | 23(79) | 42(74) | 60(69) | 62(63) |
|   |   | 25 |     |      | 16 | 16(79) | 33(74) | 50(69) | 58(64) |
| 6 | F | 25 | 500 | 2.58 | 1 | 31(79) | 54(74) | 63(69) | 61(63) |
|   |   | 25 |     |      | 16 | 10(79) | 22(74) | 38(69) | 54(64) |
| C7 | G | 25 | 500 | 0.00 | 1 | 4(76) | 7(71) | 11(66) | 17(60) |
|   |   | 25 |     |      | 19 | 3(76) | 5(71) | 9(65) | 14(60) |
| C8 | H | 25 | 500 | 1.00 | 1 | 15(76) | 25(71) | 41(65) | 50(60) |
|   |   | 25 |     |      | 19 | 7(76) | 19(71) | 42(65) | 46(60) |
| C9 | I | 25 | 500 | Mg—Zr | 1 | 4(76) | 9(71) | 17(65) | 31(60) |
|   |   | 25 |     |      | 19 | 3(76) | 7(71) | 14(65) | 25(60) |
| C10 | J | 25 | 500 | Mn—Ti | 1 | 12(76) | 15(70) | 16(65) | 19(60) |
|   |   | 25 |     |      | 20 | 3(75) | 5(70) | 8(65) | 11(59) |
| 11 | E | 25 | 650 | 0.78 | 1 | 24(79) | 44(74) | 60(69) | 62(64) |
|   |   | 25 |     |      | 21 | 7(79) | 14(74) | 24(69) | 36(64) |
| 12 | D | 2 | 500 | 0.44 | 1 | 23(76) | 35(71) | 44(65) | 50(60) |
|   |   | 2 | 500 |     | 23 | 14(76) | 26(71) | 35(66) | 44(60) |
|   |   | 25 | 500 |     | 26 | 37(76) | 56(71) | 56(65) | 59(60) |
|   |   | 5 | 500 |     | 49 | 22(76) | 37(71) | 48(66) | 53(60) |
|   |   | 15 | 500 |     | 56 | 33(76) | 49(71) | 57(65) | 56(60) |
|   |   | 25 | 500 |     | 79 | 34(76) | 53(71) | 59(65) | 57(60) |

TABLE 2

Activity of catalysts containing oxidic promoters

| Ex. | Catalyst | Promoters | steam/dry gas | TOS hours | % CO-conv at 400° C. (max % CO conv) | % CO-conv at 425° C. (max % CO conv) | % CO-conv at 450° C. (max % CO conv) | % CO-conv at 475° C. (max % CO conv) |
|---|---|---|---|---|---|---|---|---|
| 13 | K | Y | 0.53 | 1 | 47(76) | 61(71) | 62(65) | 57(60) |
|   |   |   | 0.53 | 19 | 37(76) | 54(71) | 59(65) | 55(60) |
|   |   |   | 0.53 | 37 | 28(76) | 47(71) | 56(66) | 55(60) |
|   |   |   | 0.53 | 68 | 30(76) | 49(71) | 56(65) | 55(60) |

TABLE 2-continued

Activity of catalysts containing oxidic promoters

| Ex. | Catalyst | Promoters | steam/dry gas | TOS hours | % Co-conv at 400° C. (max % CO conv) | % CO-conv at 425° C. (max % CO conv) | % CO-conv at 450° C. (max % CO conv) | % CO-conv at 475° C. (max % CO conv) |
|---|---|---|---|---|---|---|---|---|
|    |   |    | 0.53 | 92  | 28(76) | 48(71) | 56(65) | 56(60) |
|    |   |    | 0.53 | 112 | 27(76) | 46(71) | 55(65) | 56(60) |
| 14 | L | Fe | 0.53 | 1   | 45(76) | 59(71) | 61(65) | 58(60) |
|    |   |    | 0.53 | 15  | 34(76) | 51(71) | 59(65) | 57(60) |
| 15 | M | Nb | 0.53 | 1   | 27(75) | 40(70) | 51(65) | 49(65) |
|    |   |    | 0.53 | 39  | 26(76) | 41(70) | 51(65) | 55(59) |
| 16 | N | Cr | 0.53 | 1   | 51(75) | 62(70) | 62(65) | 58(60) |
|    |   |    | 0.53 | 20  | 37(75) | 51(71) | 59(65) | 58(59) |
| 17 | O | Li | 0.53 | 1   | 45(76) | 60(71) | 62(65) | 58(60) |
|    |   |    | 0.53 | 19  | 18(76) | 32(71) | 47(65) | 53(60) |

TABLE 3

Activity of catalyst K at high temperature, low steam content, high GHSV and low pressure

| Ex. | Catalyst | steam/dry gas | $T_{Hold}$ (° C.) | TOS hours | % Co-conv at $T_{Hold}$ (max % Co conversions) |
|---|---|---|---|---|---|
| 18 | K | 0.35 | 600 | 5   | 35(35) |
|    |   | 0.35 | 600 | 11  | 34(35) |
|    |   | 0.35 | 600 | 17  | 34(35) |
|    |   | 0.35 | 600 | 23  | 33(35) |
|    |   | 0.35 | 600 | 29  | 32(35) |
|    |   | 0.35 | 600 | 59  | 30(35) |
|    |   | 0.35 | 600 | 89  | 29(35) |
|    |   | 0.35 | 600 | 99  | 29(35) |
|    |   | 0.35 | 600 | 101 | 30(35) |
|    |   | 0.35 | 600 | 113 | 29(35) |
|    |   | 0.35 | 600 | 125 | 29(35) |
|    |   | 0.35 | 600 | 129 | 28(35) |
|    |   | 0.35 | 600 | 137 | 29(35) |
| 19 | K | 0.35 | 550 | 3   | 35(42) |
|    |   | 0.35 | 550 | 6   | 33(42) |
|    |   | 0.35 | 550 | 18  | 30(42) |
|    |   | 0.35 | 550 | 38  | 28(42) |
|    |   | 0.35 | 550 | 74  | 27(42) |

TABLE 4

Variation of steam content

| Ex. | Catalyst | P barg | $T_{hold}$ ° C. | steam/dry gas | TOS hours | % CO-conv at 400° C. (max % CO-conv) | % CO-conv at 425° C. (max % CO conv) | % CO-conv at 450° C. (max % CO conv) | % CO-conv at 475° C. (max % CO conv) | ppm Methane at $T_{hold}$ |
|---|---|---|---|---|---|---|---|---|---|---|
| 20 | D | 25 | 500 | 0.30 | 1  | 36(59) | 43(53) | 43(46) | 39(40) | <15 |
|    |   |    |     |      | 19 | 28(60) | 40(53) | 43(46) | 39(40) | <15 |
| 21 | E | 25 | 650 | 0.54 | 4  | 24(79) | 44(74) | 60(69) | 62(64) | 210 |
|    |   |    |     |      | 21 | 7(79)  | 14(74) | 24(69) | 36(64) | <15 |
| C22| P | 25 | 650 | 0.34 | 1  | 54(59) | 53(53) | 46(46) | 39(39) | 35000 |

NM = Not Measured.

TABLE 4A

| Ex. | Catalyst | P barg | $T_{hold}$ ° C. | steam/dry gas | TOS hours | % CO at $T_{hold}$ | % $CO_2$ at $T_{hold}$ | % $CO_2$-conv. at $T_{hold}$ (max % $CO_2$ conv) | ppm Methane at $T_{hold}$ | ppm Ethane at $T_{hold}$ |
|---|---|---|---|---|---|---|---|---|---|---|
| 23 | B | 25 | 500 | 0 | 1 | 16.55 | 5.62 | 44(45) | 100 | 0 |
|    | B | 25 | 550 | 0 | 2 | 17.29 | 5.02 | 50(52) | 290 | 20 |
|    | B | 25 | 600 | 0 | 4 | 17.81 | 4.45 | 56(59) | 990 | 120 |

TABLE 5

Activity of Cu- and Ag-promoted catalysts

| Ex. | Catalyst | promoter (%) | steam/dry gas | Dry gas flow (Nl/h) | cat. amount (g) | $T_{hold}$ °C. | TOS hours | % CO-conv at 350° C. (max % CO-conv) | % CO-conv at 375° C. (max % CO-conv) | % CO-conv at 400° C. (max % CO-conv) |
|---|---|---|---|---|---|---|---|---|---|---|
| 24 | Q | 1.1% Cu | 0.54 | 10 | 1 | 500 | 1 | 74(89) | 77(85) | 76(81) |
|    |   |         | 0.54 | 10 |   | 500 | 19 | 12(88) | 21(85) | 34(81) |
| 25 | Q |         | 0.54 | 10 | 1 | 400 | 1 | 68(88) | 74(85) | 75(80) |
|    |   |         | 0.54 | 10 |   | 400 | 19 | 60(88) | 68(85) | 71(80) |
| 26 | R | 3.7% Cu | 0.53 | 10 | 1 | 400 | 1 | 85(88) | 82(85) | 78(80) |
|    |   |         | 0.54 | 10 |   | 400 | 19 | 85(88) | 82(85) | 78(80) |
| 27 | S | 7.8% Cu | 0.53 | 10 | 1 | 400 | 1 | 85(88) | 82(85) | 78(80) |
|    |   |         | 0.54 | 10 |   | 400 | 19 | 85(88) | 82(85) | 78(80) |
| 28 | S | 7.8% Cu | 0.53 | 10 | 1 | 400 | 1 | 86(88) | 82(85) | 79(80) |
|    |   |         | 0.53 | 10 |   | 400 | 17 | 85(88) | 82(85) | 78(80) |
|    |   |         | 0.53 | 10 |   | 400 | 89 | 83(88) | 82(85) | 77(80) |
|    |   |         | 0.53 | 10 |   | 400 | 113 | 79(88) | 81(85) | 78(80) |
|    |   |         | 0.53 | 10 |   | 400 | 137 | 75(88) | 76(85) | 75(80) |
| 29 | T | 1.2% Ag | 0.53 | 10 | 1 | 400 | 1 | 14(88) | 23(85) | 38(80) |
|    |   |         | 0.53 | 10 |   | 400 | 19 | 13(88) | 23(85) | 38(81) |
| 30 | U | 4.0% Ag | 0.53 | 10 | 1 | 400 | 1 | 21(88) | 32(85) | 46(80) |
|    |   |         | 0.53 | 10 |   | 400 | 19 | 21(88) | 32(85) | 44(81) |
| 31 | V | 8.3% Ag | 0.53 | 10 | 1 | 400 | 1 | 27(88) | 41(85) | 55(81) |
|    |   |         | 0.53 | 10 |   | 400 | 19 | 27(88) | 39(85) | 52(80) |
|    |   |         | 0.53 | 10 |   | 400 | 37 | 22(88) | 32(85) | 45(80) |

TABLE 6

Activity of Cu-promoted catalysts after exposure to air

| Ex. | Catalyst | promoter (%) | $T_{redox}$ °C. | No of redox cycles | % CO conv at 200° C. (max % CO conversion) | % CO conv at 280° C. (max % CO conversion) | relative CO-conversion |
|---|---|---|---|---|---|---|---|
| 32 | S | Cu (7.8) | 280 | 1 | — | 78(93) | 100 |
|    |   |          | 280 | 2 | — | 73(93) | 94 |
|    |   |          | 280 | 3 | — | 72(93) | 92 |
|    |   |          | 280 | 4 | — | 69(93) | 88 |
| 33 | S | Cu (7.8) | 350 | 1 | — | 85(93) | 100 |
|    |   |          | 350 | 2 | — | 64(93) | 75 |
|    |   |          | 350 | 3 | — | 61(93) | 72 |
|    |   |          | 350 | 4 | — | 56(93) | 66 |
| C34 | W | Cu/Zn/Al | 200 | 1 | 83(98) | — | 100 |
|     |   |          | 200 | 2 | 70(98) | — | 84 |
|     |   |          | 200 | 3 | 63(98) | — | 76 |
|     |   |          | 200 | 4 | 61(98) | — | 73 |
| C35 | W | Cu/Zn/Al | 300 | 1 | 82(98) | — | 100 |
|     |   |          | 300 | 2 | 59(98) | — | 72 |
|     |   |          | 300 | 3 | 52(98) | — | 63 |
|     |   |          | 300 | 4 | 47(98) | — | 57 |
|     |   |          | 300 | 5 | 44(98) | — | 54 |

TABLE 7

Catalyst compositions

| Catalyst | % Mn | % Zr | M' | % M' | Alkali | % Alkali |
|---|---|---|---|---|---|---|
| A | 2.5 | 68.8 | — | — | K | <0.01 |
| B | 6.8 | 60.5 | — | — | K | NM |
| C | 12.6 | 54.9 | — | — | K | 0.09 |
| D | 14.4 | 53.8 | — | — | K | 0.01 |
| E | 21.1 | 44.8 | — | — | K | NM |
| F | 41.0 | 26.4 | — | — | K | 0.01 |
| G | — | 71.5 | — | — | K | NM |
| H | 67.5 | — | — | — | K | NM |
| I | — | 60.6 | Mg | 6.2 | K | 0.19 |
| J | 12.1 | — | Ti | 44.5 | K | NM |
| K | 11.8 | 52.3 | Y | 2.3 | K | 0.09 |
| L | 13.0 | 45.1 | Fe | 2.7 | K | 0.13 |
| M | 11.6 | 50.7 | Nb | 7.4 | K | 0.04 |
| N | 11.1 | 53.5 | Cr | 2.9 | K | NM |
| O | 12.0 | 55.2 | — | — | Li | 0.60 |
| P | Commercial Fe/Cr/Cu catalyst for high-temperature WGS. | | | | | |
| Q | 14.9 | 45.6 | Cu | 1.1 | K | 0.09 |

TABLE 7-continued

| | Catalyst compositions | | | | | |
|---|---|---|---|---|---|---|
| Catalyst | % Mn | % Zr | M' | % M' | Alkali | % Alkali |
| R | 11.9 | 48.3 | Cu | 3.7 | K | 0.02 |
| S | 12.4 | 44.4 | Cu | 7.8 | K | 0.21 |
| T | 13.1 | 47.1 | Ag | 1.2 | K | 0.21 |
| U | 13.0 | 45.8 | Ag | 4.0 | K | 0.60 |
| V | 12.1 | 43.2 | Ag | 8.3 | K | 0.69 |
| W | Commercial Cu/Zn/Al catalyst for low-temperature WGS. | | | | | |

NM = Not Measured

The invention claimed is:

1. A process for the treatment of synthesis gas to increase content of hydrogen and/or carbon monoxide in the synthesis gas comprising the step of contacting the synthesis gas with a catalyst comprising oxides of manganese and zirconium, which metals are present in the catalyst in a molar ratio Mn/Zr of between 0.05 to 5.00 and wherein the oxides of manganese and zirconium constitute at least 50% by weight of the catalyst in its reduced form.

2. The process of claim 1, wherein the catalyst further comprises a metallic component selected from the group consisting of copper, silver, gold, palladium, platinum, oxides of transition metals from Group 3 to 8 of the Periodic Table, and the lanthanides.

3. The process of claim 2, wherein the metallic component is copper.

4. The process of claim 2, wherein the oxides of transition metals are selected from the group consisting of oxides of yttrium, titanium, vanadium, niobium, chromium, iron, cerium, lanthanides and mixtures thereof.

5. The process of claim 1, wherein the catalyst is in the form of a thin layer supported on a geometrical body placed in at least part of a passageway through which the synthesis gas is transported.

6. The process of claim 1, wherein the catalyst is in the form of a thin layer supported on at least part of an inner wall of a passageway through which the synthesis gas is transported.

7. The of claim 1, wherein the catalyst is in the form of one of pellets, extrudates, tablets, monoliths and geometrical bodies.

8. The process of claim 1, wherein the synthesis gas is an effluent stream of a reaction selected from the group consisting of catalytic steam reforming of hydrocarbons, autothermal steam reforming of hydrocarbons, secondary steam reforming of hydrocarbons, gasification of hydrocarbons, gasification of coal, and fuel-processing for the production of energy.

* * * * *